(No Model.)
W. C. BAUFILL.
BURR FOR KNITTING MACHINES.
No. 347,986. Patented Aug. 24, 1886.
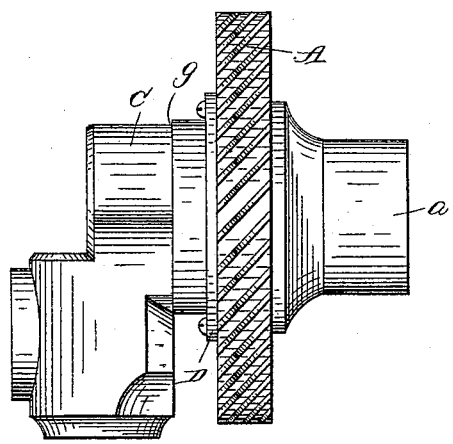
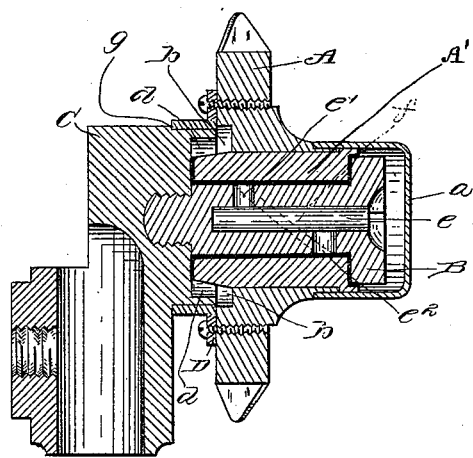
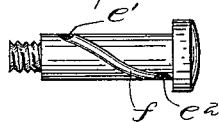
WITNESSES
Howard J. Schneider
Thos. McGill
INVENTOR
William C. Baufill
By Myers & Co.
ATTORNEYS.

UNITED STATES PATENT OFFICE.

WILLIAM C. BAUFILL, OF IPSWICH, MASSACHUSETTS.

BURR FOR KNITTING-MACHINES.

SPECIFICATION forming part of Letters Patent No. 347,986, dated August 24, 1886.

Application filed March 16, 1886. Serial No. 195,445. (No model.)

*To all whom it may concern:*

Be it known that I, WILLIAM C. BAUFILL, a citizen of the United States of America, residing at Ipswich, in the county of Essex and State of Massachusetts, have invented certain new and useful Improvements in Burrs for Knitting-Machines, of which the following is a specification, reference being had therein to the accompanying drawings.

This invention pertains to improvements in knitting-machine burrs, having reference more especially to means for the lubrication of and exclusion of lint or other foreign or extraneous matter from their shaft-bearings; and the invention consists of the combinations of parts, including their construction, substantially as hereinafter set forth, and pointed out in the claims.

In the accompanying drawings, Figure 1 is a side elevation of a knitting-machine-needle wheel embodying my invention. Fig. 2 is a sectional elevation of the same, and Fig. 3 is a detail view thereof.

In the figures of the drawings the invention is not shown in its operative position.

In carrying out my invention I rigidly secure in the wheel A, or cast therewith, a bushing or collar, A', which projects slightly beyond said wheel on either side, and I mount the said wheel and bushing upon a shaft or spindle, B, the outer flanged portion of which shaft or spindle rests against the outer end of said bushing or collar. The outer end of this spindle or shaft is inclosed by a cap, $a$, the inner end of which is tightly secured on the narrowed portion of an outwardly-projecting flange of the front surface of the wheel. The object of thus inclosing the end of the spindle or shaft is to protect it from gathering lint or other foreign matter that would otherwise adhere to and clog it.

The wheel A is formed with a rear annular recess or space, $b$, around the bushing or collar, and its shaft or spindle B is seated or stepped in the bracket C, which latter is suitably adapted to permit of securing the same in position in the knitting-machine. The surface of the bracket C adjoining the annular space or recess $b$ of the wheel A is dished or recessed, as at $d$, to receive lubricant, while the shaft or spindle B is provided with a central longitudinal lubricant-passage, $e$, lateral passage $e'$, and a second lateral passage, $e^2$, communicating with the central passage, $e$, and with a spiral passage or groove, $f$, upon the outer surface of the spindle or shaft B, which groove or passage extends to the lateral passage $e'$, the same winding around the shaft in the direction or plane of rotation of the wheel.

By removing the cap $a$ the oil or lubricant is inserted into the central passage, $e$, and finds its way out through the lateral passage $e'$, and as the wheel revolves in the direction of the plane of the groove on the spindle or shaft the oil or lubricant will be carried by said groove to the lateral passage $e^2$, and will pass down into the central passage, $e$, thus lubricating it externally. The oil or lubricant will eventually again reach the lateral passage $e'$, and said lubricant will be carried by said groove or passage $f$ up to and again through the passage $e^2$, whence it will again pass through the central passage, $e$, and again out through the passage $e'$ and into the groove or passage $f$, and again up the outside of the shaft or spindle, which operation or distribution of the lubricant, it is obvious, is continually kept up, commensurate with the supply of the lubricant kept in the reservoir. This method of lubricating the parts, it will be seen, reuses and fully utilizes the lubricant, using over and over the same, and thereby preventing waste, whereby the supplying of lubricant to the bracket, dish, or reservoir is not required to be repeated as frequently as would otherwise be necessary.

Upon the rear side of the wheel is bolted or fastened the right-angular or flat portion of a guard or collar, D, with its remaining or outer portion surrounding the cylindric surface or neck of the bracket C, and let into a shallow annular recess, $g$, in the latter, having for its object to effectively exclude from between the parts lint or other foreign matter.

I am aware that it is not new to provide a spindle having a special bearing, an oil-cup, a wharve-tube, an intermediate loose tube, and a helical groove formed between the special bearing and the wharve-tube for producing an upward and downward flow of oil between said bearings and tubes; also, a burr having a pendent flange, a sleeve having a closed top, and a spindle having an annular oil-cup; also, a burr attached to a hollow shaft which passes down and rests upon the bottom of the oil-reservoir, and closed at its top by a cap, and through which reservoir is passed and secured a spindle having spiral grooves connected by a notch at the top thereof; but my invention is designed as an improvement over such devices; and to this end I provide a central passage in the spindle or shaft and two oppositely-disposed lateral passages connected at their outer ends by a spiral groove, said spindle being secured to the outer forward end of a bracket. The outer end of this spindle is provided with a cap, by removing which oil can be inserted in the central passage of the said spindle or shaft, the end of said cap being secured on a flanged portion of the wheel.

Having thus fully described my invention, what I claim, and desire to secure by Letters Patent, is—

1. The combination, with the wheel, of the spindle or shaft having a central passage and two lateral passages, connected at their outer ends by a spiral groove, the dished bracket or reservoir formed with a recess, and the collar or guard secured to said wheel, substantially as shown and described.

2. The combination, with the dished bracket or reservoir, the wheel, and the collar or guard secured thereto, of the spindle or shaft having a central passage and two lateral passages, connected by a spiral groove, substantially as shown and described.

In testimony whereof, I affix my signature in presence of two witnesses.

WILLIAM C. BAUFILL.

Witnesses:
EDWARD H. BAXTER,
EVERARD H. MARTIN.

Correction in Letters Patent No. 347,986.

Affidavit having been filed showing that the name of the patentee in Letters Patent No. 347,986, granted August 24, 1886, for an improvement in "Burrs for Knitting Machines," should have been written and printed *William C. Banfill* instead of "William C. Baufill," it is hereby certified that the proper correction has been made in the files and records of the case in the Patent Office, and that the said Letters Patent should be read to conform thereto.

Signed, countersigned, and sealed this 7th day of September, A. D. 1886.

[SEAL.]
                   D. L. HAWKINS,
                   *Acting Secretary of the Interior*

Countersigned:
  R. B. VANCE,
    *Acting Commissioner of Patents.*